April 5, 1932. H. N. PACKARD 1,852,330
PRESSURE REGULATING APPARATUS FOR ELASTIC FLUIDS
Original Filed Jan. 28, 1921
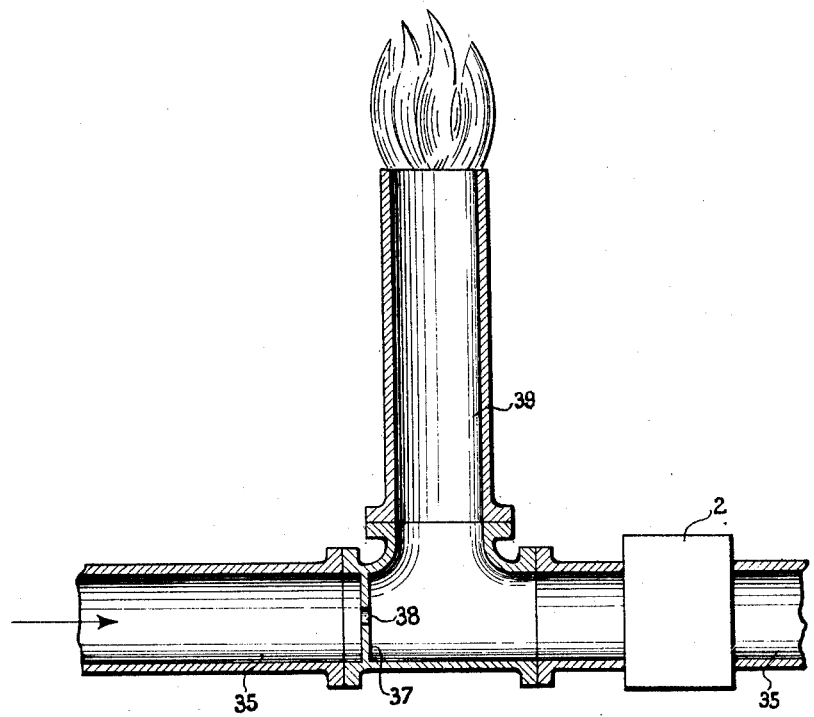
INVENTOR.
Horace. N. Packard
BY
ATTORNEY.

Patented Apr. 5, 1932

1,852,330

UNITED STATES PATENT OFFICE

HORACE N. PACKARD, OF OSSINING, NEW YORK, ASSIGNOR, BY MESNE ASSIGNMENTS, TO CUTLER-HAMMER, INC., A CORPORATION OF DELAWARE

PRESSURE REGULATING APPARATUS FOR ELASTIC FLUIDS

Original application filed January 28, 1921, Serial No. 440,616. Divided and this application filed June 8, 1927. Serial No. 197,417.

This invention relates to pressure regulating apparatus for elastic fluids and has for its object to provide a simple and inexpensive regulator whereby a stream of such fluid may be delivered at a pressure which within very fine limits is equal to a certain given pressure. While not limited thereto the invention is especially applicable to the pressure regulation of the test gas being delivered to the burner of a gas calorimeter, when it is desired that said test gas shall be delivered at atmospheric pressure.

This application is a division of my copending application Serial No. 440,616, filed January 28, 1921, which has resulted in Patent No. 1,662,802, dated March 13, 1928.

The invention may be said to consist essentially in an apparatus for maintaining the pressure of a flow of fluid at a given pressure, comprising a conduit for such flow of fluid, a by-pass affording open communication between the interior of said conduit and a region wherein such given pressure obtains, and means restricting the rate of flow of fluid along said conduit to said by-pass to a value which will enable fluid to traverse said bypass to said region without any substantial change in pressure along said by-pass.

One embodiment of the invention is illustrated in the accompanying drawing and the same will now be described, it being understood that the embodiment illustrated is susceptible of various modifications without departing from the scope of the appended claims.

This drawing illustrates a conduit 35, a barrier 37 located within the conduit 35 and provided with a materially reduced opening 38, and an open ended branch pipe 39 connecting said conduit on the delivery side of said barrier directly with atmosphere. In operation the barrier serves to restrict the flow of gas therebeyond to a value which is able to escape through the pipe 39 without raising the pressure upon the delivery side of said barrier above atmospheric pressure, whereas the outward flow of gas through said pipe 39 effectively prevents induction of air. The gas so issuing from the pipe 39 is ordinarily ignited and burned to avoid pollution of the surrounding air. Such continuous efflux of gas in appreciable quantities from said tube further serves to insure that the test gas drawn into the pump (shown diagrammatically at 2) constitutes a true sample of the main supply undergoing test.

This apparatus may conveniently be adopted in connection with the calorimetric device described in my patent aforementioned for insuring that the test gas drawn into the gas pump 2 and delivered to the burner shall be of atmospheric pressure.

In this way provision may be made for supplying test gas as well as combustion air and cooling air to the device illustrated in said patent under like conditions of temperature, pressure and saturation and in constant volumetric proportions with respect to one another, such proportions moreover being unaffected by variation in speed of the driving motor.

What I claim as new and desire to secure by Letters Patent is:

1. A pressure regulator for gaseous fluids comprising a conduit, a barrier located at one end of said conduit and provided with a restricted opening, the other end of said conduit being unrestricted, means for withdrawing fluid from the last mentioned end of said conduit, and means located beyond said barrier, with reference to the direction of flow of fluid within said conduit, affording open communication between the interior of said conduit and a region wherein given pressure conditions obtain.

2. A pressure regulator for gaseous fluids comprising a conduit, a barrier located at one end of said conduit and provided with a restricted opening, the other end of said conduit having an unrestricted passage, means for withdrawing fluid from the last mentioned end of said conduit, and means affording open communication between the interior of said conduit and atmosphere.

3. The combination with a fluid pump having an intake conduit, of means affording open communication between the interior of said conduit and atmosphere and means restricting the flow of fluid toward said former means and said pump to a value which is able to escape through said former means without effecting a rise in pressure within the conduit adjacent the pump while providing against influx of fluid through said former means to said conduit.

4. The combination with a pump having an intake conduit, of pressure regulating means therefor comprising a barrier located in said conduit and having a restricted opening and a tube connected to said conduit between said barrier and said pump for affording direct and unrestricted communication between the interior of said conduit and atmosphere.

5. Apparatus for maintaining the pressure of a flow of gaseous fluid of a given value, comprising a conduit for such flow of fluid, a by-pass located intermediate the inlet and outlet ends of said conduit and affording open communication between the interior of the latter and a region wherein such pressure of given value obtains, and means restricting the rate of flow of fluid along said conduit to said by-pass to a value which will enable fluid to traverse said by-pass to said region without any substantial change in pressure along said by-pass, the unrestricted outlet end of said conduit constituting the intake end of a fluid pump whereby said flow of fluid is effected.

In witness whereof I have hereunto subscribed my name.

HORACE N. PACKARD.